(12) United States Patent
Kubota et al.

(10) Patent No.: US 7,882,050 B2
(45) Date of Patent: Feb. 1, 2011

(54) DATA DIVISION APPARATUS, DATA DIVISION METHOD AND PROGRAM

(75) Inventors: Kazuto Kubota, Kawasaki (JP); Chie Morita, Yokohama (JP); Hisaaki Hatano, Kawasaki (JP); Akihiko Nakase, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1351 days.

(21) Appl. No.: 11/385,738

(22) Filed: Mar. 22, 2006

(65) Prior Publication Data

US 2006/0269144 A1    Nov. 30, 2006

(30) Foreign Application Priority Data

May 25, 2005    (JP) .............................. 2005-152324

(51) Int. Cl.
    *G06N 5/00*    (2006.01)
(52) U.S. Cl. .......................................... 706/16; 706/45
(58) Field of Classification Search .................. 706/16, 706/45; 382/157, 225
    See application file for complete search history.

(56) References Cited

U.S. PATENT DOCUMENTS 5,335,291 A * 8/1994 Kramer et al. .............. 382/158
5,444,796 A * 8/1995 Ornstein ..................... 382/157
5,590,218 A * 12/1996 Ornstein ..................... 382/157
6,581,058 B1    6/2003 Fayyad et al.

OTHER PUBLICATIONS

Martinez, Neural Tree Density Estimation for Novelty Detection, IEEE, Transactions on Neural Networks, vol. 9, No. 2, Mar. 1998, pp. 330-338.*
"Chapter 10 Automatic Cluster Detection", Data Mining Techniques, pp. 187-215.

* cited by examiner

*Primary Examiner*—Wilbert L Starks, Jr.
(74) *Attorney, Agent, or Firm*—Oblon, Spivak, McClelland, Maier & Neustadt, L.L.P.

(57) ABSTRACT

According to an aspect of the present invention, there is provided with a data division apparatus which divides multi-dimensional data, including: a data input unit which inputs multi-dimensional data; a division plane candidate creator which creates a plurality of division plane candidates for dividing the multi-dimensional data; a data provisional division unit which provisionally divides the multi-dimensional data by using the division plane candidate to generate clusters; a model generator which generates models from the clusters; an evaluation value calculator which calculates an evaluation value on the basis of the generated models and the multi-dimensional data; a division candidate selector which compares evaluation values respectively corresponding to the division plane candidates and selects a division plane candidate having a highest evaluation value; and a data division unit which divides the multi-dimensional data by using the selected division plane candidate.

7 Claims, 18 Drawing Sheets

DATA 1 x1, y1
DATA 2 x2, y2
DATA 3 x3, y3
•
•
•
DATA i xi, yi
•
•
•
DATA n xn, yn

FIG. 5

TARGET DIMENSION

DATA 1   x1, y1, z1、w1
DATA 2   x2, y2, z2、w2
DATA 3   x3, y3, z3、w3
          ⋮
DATA i   xi, yi, zi、wi
          ⋮
DATA n   xn, yn, zn、wn

FIG. 16

DATA 1   x1, y1, z1
DATA 2   x2, y2, z2
DATA 3   x3, y3, z3
          ⋮
DATA i   xi, yi, zi
          ⋮
DATA n   xn, yn, zn

FIG. 17

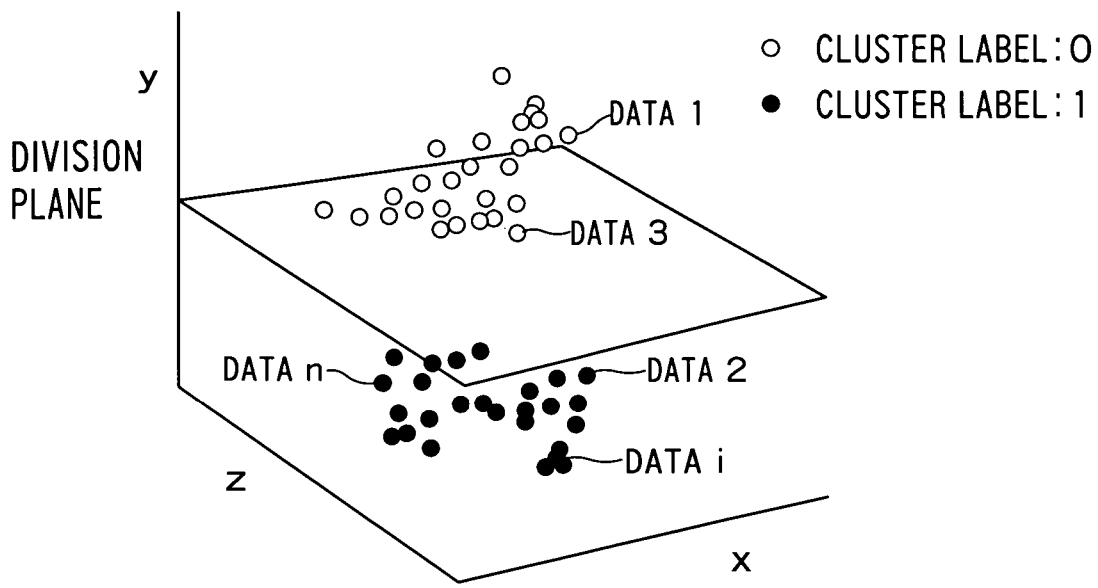
FIG. 18
DATA 1  x1, y1, z1、w1, 0
DATA 2  x2, y2, z2、w2, 1
DATA 3  x3, y3, z3、w3, 0
         •
         •
         •
DATA i  xi, yi, zi、wi, 1
         •
         •
         •
DATA n  xn, yn, zn、wn, 1
FIG. 19
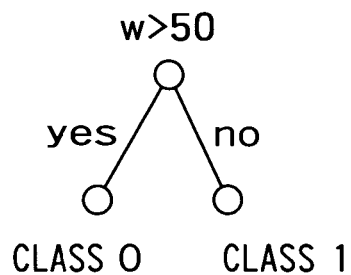
FIG. 20

DATA DIVISION APPARATUS, DATA DIVISION METHOD AND PROGRAM

CROSS-REFERENCE TO RELATED APPLICATIONS

This application claims the benefit of priority under 35USC §119 to Japanese Patent Application No. 2005-152324 filed on May 25, 2005, the entire contents of which are incorporated herein by reference.

BACKGROUND OF THE INVENTION

1. Field of the Invention

The present invention relates to a data division apparatus, data division method and program used to conduct data division (clustering) on a point set in an n-dimensional space.

2. Related Art

In recent years, a plant system is constructed so as to find an abnormality in the plant by monitoring proper ranges of sensors attached to individual apparatuses (objects to be measured) included in the plant system, in some cases. A proper range that the sensor value should assume is previously set, and an abnormality alarm is issued when the sensor value has got out of the proper range. As the number of sensors increases, automatization of the proper range setting is desired. For setting a proper range for a certain sensor (hereafter referred to as target sensor), at least one other sensor (hereafter referred to as explanatory sensor) can be used. A model for predicting the target sensor on the basis of the explanatory sensor is constructed. If its predicted value differs largely from the actual value, the possibility that the target sensor indicates an abnormal value is high.

The prediction model can be created by using time series data (multi-dimensional data) of the target sensor and the explanatory sensor collected in the past. In general, however, construction of this prediction model is not easy. It is because a value assumed by the target sensor is not determined uniquely by the value of the explanatory sensor, but it depends on the running situation of the plant as well. This situation will now be described by using an example of a sensor in a power plant.

It is now supposed that there is plot data (running history data) with its ordinate indicating a pressure of a pump output from the target sensor and its abscissa indicating a generated power output which is output from the explanatory sensor. The pump has an operation state and a non-operation state. It is supposed that in the operation state of the pump the pressure of the pump is in proportion to the generated power output and in the non-operation state of the pump the pressure of the pump assumes a low constant value. If a model for predicting the value of the target sensor on the basis of the explanatory sensor is generated by using, for example, regression analysis, without separating the above two operation situations, the error of the model becomes great. It is desirable to generate models respectively based on the operation situations of the pump. For doing so, it is necessary to separate a set of points in the running history data into a plurality of groups and generate models respectively for groups.

As techniques for grouping points on a plane or in a space, there are the k-means method and the agglomerative method. These techniques are described in Michael J A Berryand Gordon Linoff, "Data Mining Techniques", Wiley Computer Publising, pp. 187-215.

In the k-means method, k initial points are selected previously, and each point of remaining points is regarded as belonging to the same group as a point among the k points closest to the point. A centroid is calculated for every group, and grouping is repeated again regarding centroids as k initial points. On the other hand, in the agglomerative method, a combination having the shortest distance among all combinations of points is regarded as one group. A centroid of grouped points is regarded as one point, and similar processing is repeated until all points belong to one group. Incidentally, as for other ways of measuring a distance, there are a method using a distance between closest points in groups and a method using a distance between farthest points.

In these techniques, basically close points are grouped and only a distance between points is considered. In these techniques, therefore, grouping properly reflecting the above-described state of the measurement subject, i.e., grouping reflecting the tendency other than the distance between points, which is immanent in the multi-dimensional data, for example, grouping close to human instinct, cannot be conducted.

SUMMARY OF THE INVENTION

According to an aspect of the present invention, there is provided with a data division apparatus which divides multi-dimensional data including a plurality of data pieces, comprising: a data input unit which inputs the multi-dimensional data; a division plane candidate creator which creates a plurality of division plane candidates for dividing the multi-dimensional data; a data provisional division unit which provisionally divides the multi-dimensional data by using the division plane candidates to generate clusters from each of the division plane candidates, the clusters each including one or more data piece; a model generator which generates models representing the clusters, per each of the division plane candidates; an evaluation value calculator which calculates evaluation values for evaluating the division plane candidates, on the basis of the models generated associated with the division plane candidates and the multi-dimensional data; a division candidate selector which compares evaluation values respectively corresponding to the division plane candidates and selects a division plane candidate having a highest evaluation value; and a data division unit which divides the multi-dimensional data by using the selected division plane candidate.

According to an aspect of the present invention, there is provided with a data division apparatus which divides multi-dimensional data including a plurality of data pieces, comprising: a data input unit which inputs the multi-dimensional data; a division plane candidate creator which creates a plurality of division plane candidates for dividing the multi-dimensional data; a data provisional division unit which provisionally divides the multi-dimensional data by using the division plane candidates to generate clusters from each of the division plane candidates, the clusters each including one or more data piece; a model generator which generates models representing the clusters, per each of the division plane candidates; a grouping unit which generates new clusters by grouping data pieces in the multi-dimensional data, based on which of the generated models each data piece in the multi-dimensional data is close to, per each of the division plane candidates; an evaluation value calculator which calculates evaluation values for evaluating the groupings associated with the division plane candidates, based on the models generated associated with the division plane candidates and the new clusters generated associated with the division plane candidates; and a division candidate selector which compares evaluation values respectively corresponding to the division plane candidates and selects grouping result corresponding a division plane candidate having a highest evaluation value.

According to an aspect of the present invention, there is provided with a data division method which divides multi-dimensional data including a plurality of data pieces, comprising: inputting the multi-dimensional data; creating a plurality of division plane candidates for dividing the multi-dimensional data; provisionally dividing the multi-dimensional data by using the division plane candidates to generate clusters from each of the division plane candidates, the clusters each including one or more data piece; generating models representing the clusters, per each of the division plane candidates; calculating evaluation values for evaluating the division plane candidates, on the basis of the models generated associated with the division plane candidates and the multi-dimensional data; comparing evaluation values respectively corresponding to the division plane candidates and selecting a division plane candidate having a highest evaluation value; dividing the multi-dimensional data by using the selected division plane candidate; and performing the creating, the dividing, the generating, the calculating, the comparing and the dividing for divided multi-dimensional data.

According to an aspect of the present invention, there is provided with a program for inducing a computer to execute: reading out multi-dimensional data including a plurality of data pieces, from a storage device; creating a plurality of division plane candidates for dividing the multi-dimensional data; provisionally dividing the multi-dimensional data by using the division plane candidates to generate clusters from each of the division plane candidates, the clusters each including one or more data piece; generating models representing the clusters, per each of the division plane candidates; calculating evaluation values for evaluating the division plane candidates, on the basis of the models generated associated with the division plane candidates and the multi-dimensional data; comparing evaluation values respectively corresponding to the division plane candidates and selecting a division plane candidate having a highest evaluation value; dividing the multi-dimensional data by using the selected division plane candidate; and performing the creating, the dividing, the generating, the calculating, the comparing, the dividing for divided multi-dimensional data.

BRIEF DESCRIPTION OF THE DRAWINGS

FIG. 5 shows an example of two-dimensional input data;

FIG. 16 shows an example of four-dimensional input data;

FIG. 17 shows an example of three-dimensional data extracted from data shown in FIG. 16;

FIG. 18 shows an example of clusters assigned with class numbers;

FIG. 19 shows an example of data assigned with class numbers;

FIG. 20 shows an example of a decision tree;

DETAILED DESCRIPTION OF THE INVENTION

First, an outline of an embodiment of the present invention will be described briefly.

Figure 4:
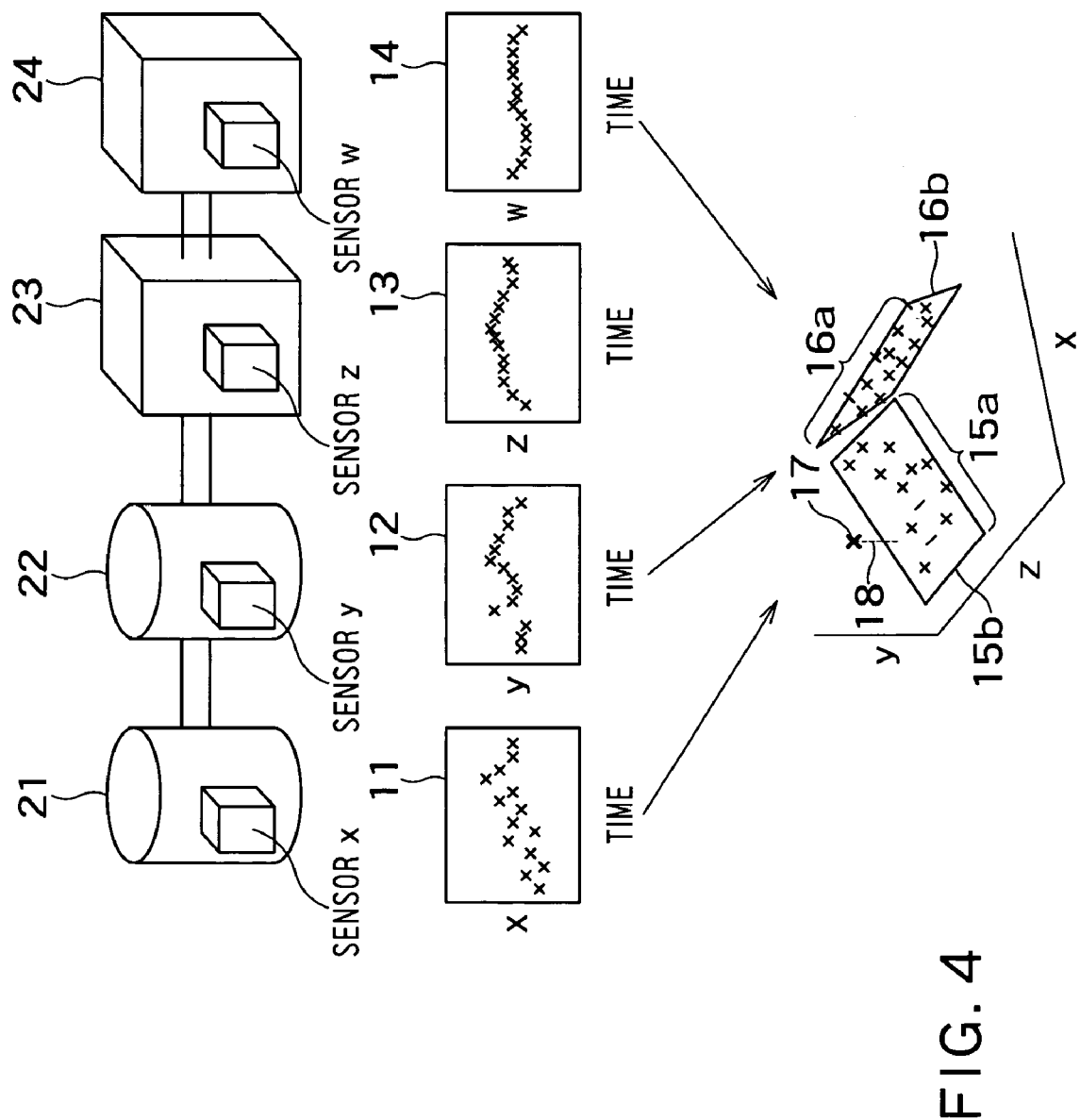
FIG. 4 is a diagram showing an outline of an embodiment of the present invention.

FIG. 4 is a diagram showing an outline of an embodiment of the present invention.

Measurement subjects 21, 22, 23 and 24 are disposed in facilities in a plant. Sensors x, y, z and w are installed respectively in the measurement subjects 21, 22, 23 and 24. Data 11, 12, 13 and 14 acquired respectively from the sensors x, y, z and w in time series are stored as four-dimensional data having a series length n (multi-dimensional data) (see FIG. 5, however, FIG. 5 shows two-dimensional data having a series length n). One of the sensors x, y, z and w is designated as a target sensor, and remaining sensors are designated as explanatory sensors. It is now supposed that the sensor y is designates as the target sensor and the sensors x, z and w are designated as explanatory sensors.

The present embodiment provides a technique capable of reflecting the state of the measurement subject of the target sensor and conducting data division (clustering) on multi-dimensional data, i.e., data division which properly reflects the tendency other than the distance between points, immanent in multi-dimensional data. By this data division, multi-dimensional data are properly divided into a plurality of clusters. In the present embodiment, models respectively corresponding to clusters are also generated. FIG. 4 shows an example in which two clusters 15a and 16a are generated from multi-dimensional data and models 15b and 16b are generated respectively from the clusters. Here, only x and z are used as the explanatory sensors.

The models 15b and 16b thus generated are used to, for example, determine in real time whether the value of the target sensor y is in a proper range. For example, it is determined on the basis of a previously generated classification rule which of the clusters 15a and 16a data 17 of the target sensor acquired at a certain point of time belongs to. It is now assumed that the data 17 belongs to the cluster 15a. In this case, data 17 is input to the model 15b and a model output is found. A difference 18 between the model output and the data 17 is calculated. If the difference 18 is in a predetermined range, the measurement subject is judged to be in the normal state. Otherwise, the measurement subject is judged to be in the abnormal state.

Hereafter, embodiments of the present invention will be described in detail.

FIRST EMBODIMENT

Figure 1:
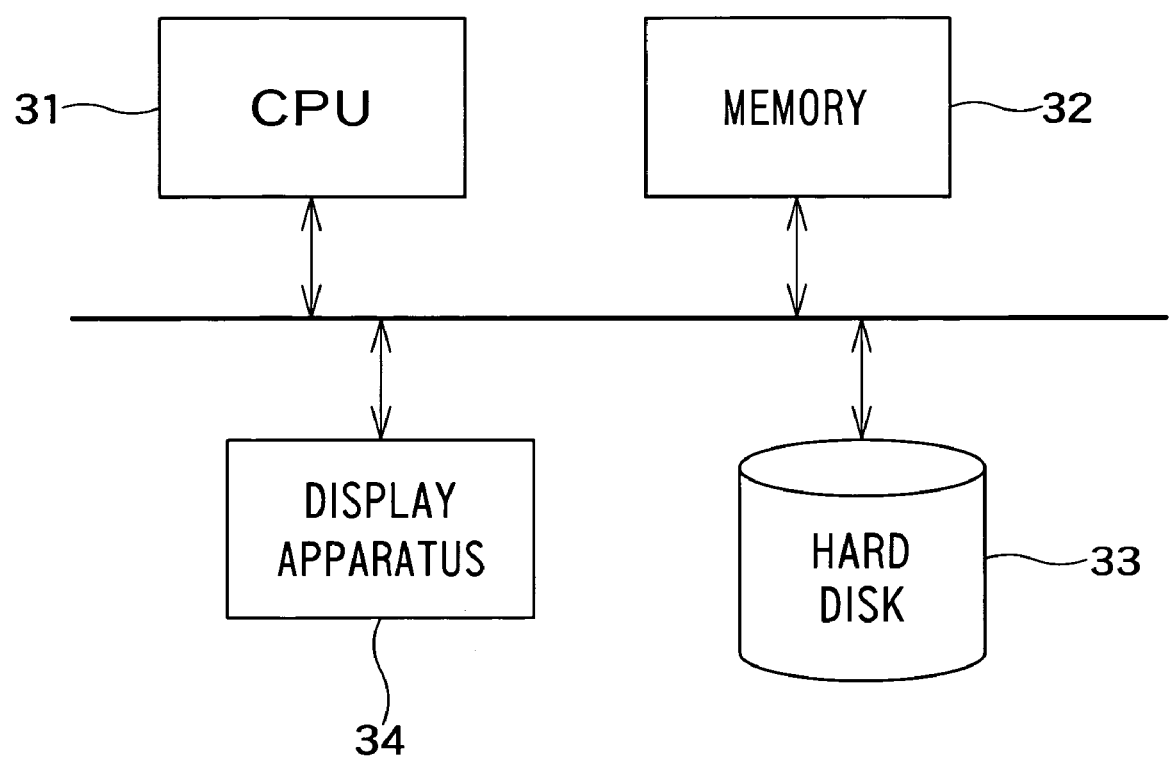
FIG. 1 shows a configuration of a data division system according to an embodiment of the present invention.

FIG. 1 is a block diagram showing a configuration of a data division system according to the present embodiment.

This data division system includes a CPU 31, a memory 32, a hard disk 33, and a display apparatus 34. A program is stored on the hard disk 33 to implement the present embodiment. Data acquired from a plurality of sensors in time series are stored on the hard disk 33 as multi-dimensional data. The CPU 31 loads the program stored on the hard disk 33 into the memory 32 and executes the program. The display apparatus 34 displays a result of execution in the CPU 31 to the user.

Figure 2:
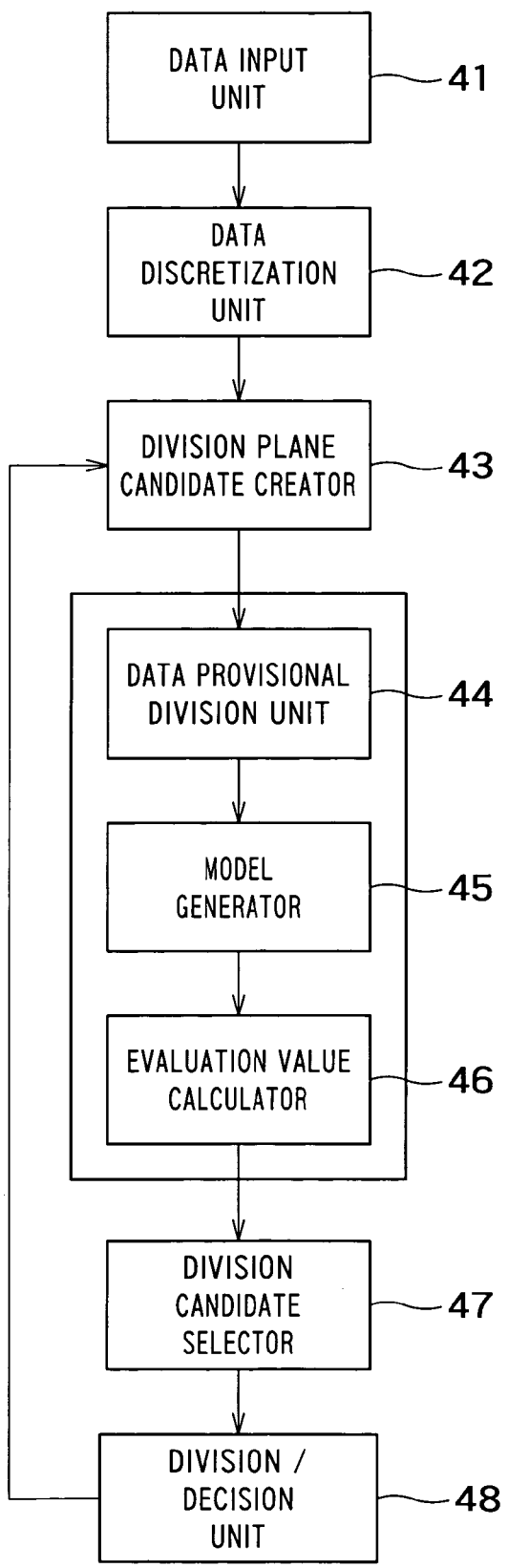
FIG. 2 is a functional block diagram of a data division apparatus.
Figure 3:
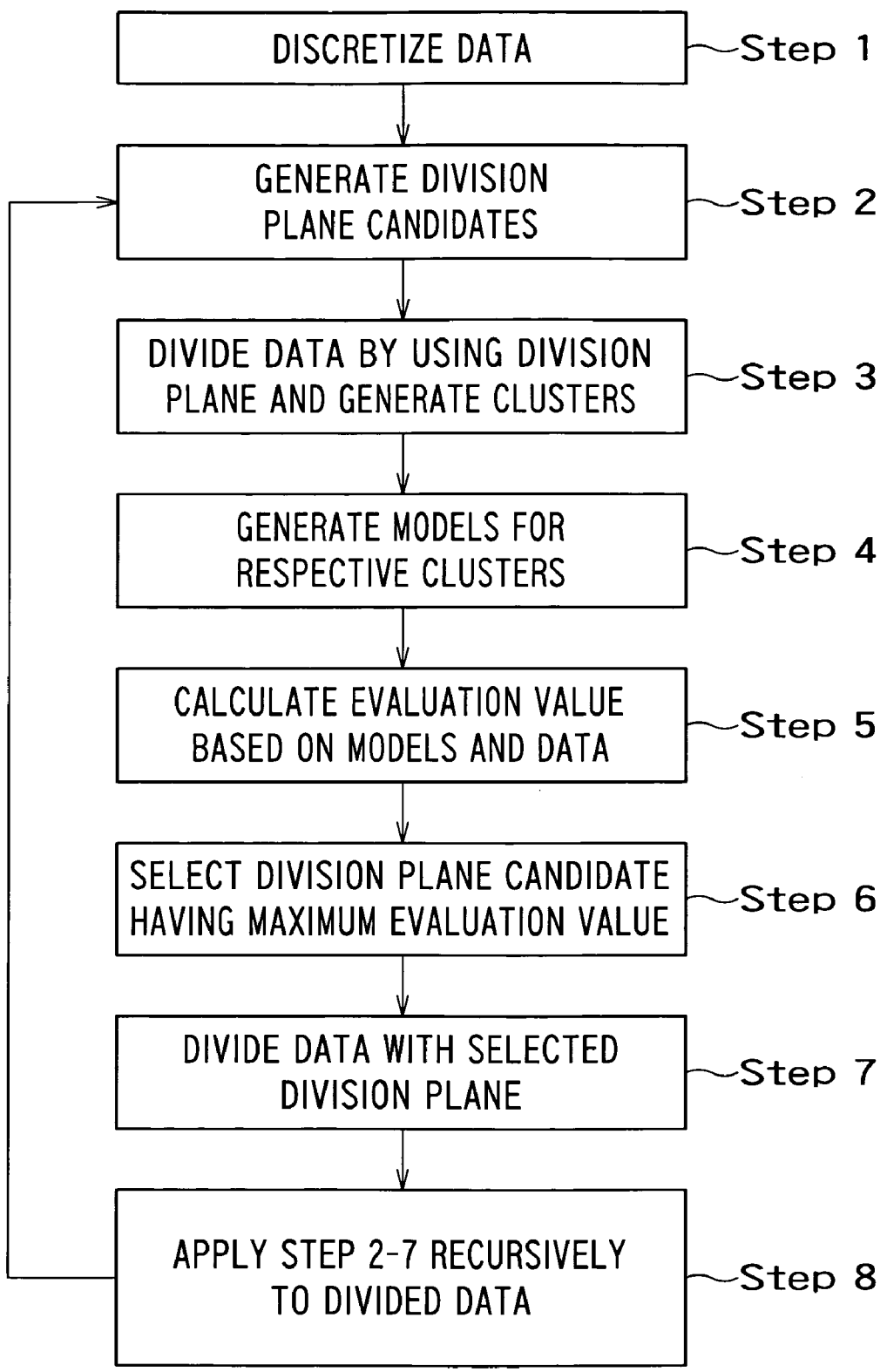
FIG. 3 is a flow chart showing a flow of processing conducted by a data division apparatus.

FIG. 2 is a functional block of the CPU 31 (data division apparatus). FIG. 3 is a flow chart showing a flow of processing conducted by the CPU 31.

The data division apparatus shown in FIG. 2 includes a data input unit 41, a data discretization unit 42, a division plane candidate creator 43, a data provisional division unit 44, a model generator 45, an evaluation value calculator 46, a division candidate selector 47, and a division/decision unit 48.

The data input unit 41 inputs multi-dimensional data to the data discretization unit 42. The multi-dimensional data includes a plurality of data pieces. An example of the multi-dimensional data is shown in FIG. 5. Here, two-dimensional data having a series length n is shown. The number of dimensions may be greater than two.

The data discretization unit 42 discretizes the input multi-dimensional data (step 1). Hereafter, details thereof will be described.

Elements in each of x and y dimensions are discretized to integers in the range of 0 to 1-m by using a minimum value and a maximum value. Here, m is an arbitrary integer given by the user. For example, it is now supposed that the x dimension has a minimum value xmin and a maximum value xmax and ith data (i.e. ith data piece) has a value xi in the x dimension. A value xdi of the ith data in the x dimension after discretization depends on which section from the head among sections obtained by equally dividing the range between xmin and xmax by m, xi comes in. The processing heretofore described is conducted for the y dimension as well. Owing to the processing heretofore described, the elements xi and yi of the data i in respective dimensions are respectively discretized to xdi and ydi (where $0 \leq xdi \leq m-1$, $0 \leq ydi \leq m-1$, and xdi and ydi are integers).

Figure 6:
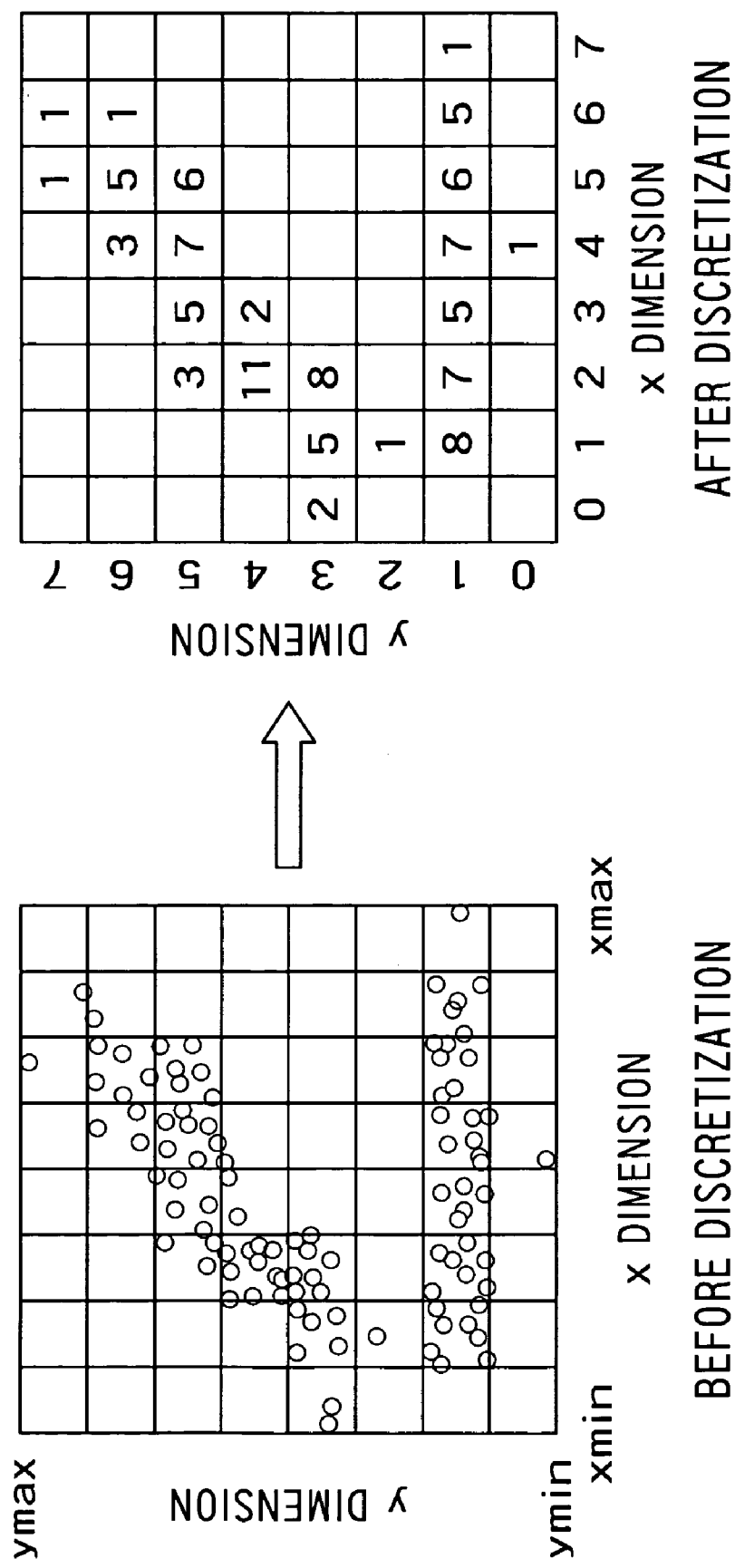
FIG. 6 shows data before discretization and data after discretization.

FIG. 6 shows how input data (multi-dimensional data) is discretized. The left half shows data before the discretization, whereas the right half shows data (matrix) after the discretization. In this example, the case where the multi-dimensional data are two-dimensional data and m=8 is shown. Each two-dimensional point before discretization is mapped into any one square in the 8 by 8 matrix after the discretization. For example, if the ith data before the discretization becomes xdi=2 and ydi=4 after the discretization, one is added to the square having 2 in the x dimension and 4 in the y dimension in the matrix shown in the right half of FIG. 6. In the right half of FIG. 6, each blank indicates zero. Data (points) that come in the same square are handled as data having, for example, center coordinates of the same square.

In processing described hereafter and processing in other embodiments, either of data before the discretization and data after the discretization may be used as the multi-dimensional data unless otherwise mentioned. In the former case, the processing becomes fast, but the precision becomes lower. Conversely, in the latter case, the processing time becomes longer, but the precision becomes higher. In other words, the discretization processing is conducted to reduce the amount of calculation in processing at step 2 and subsequent steps, and is not indispensable for the present invention.

The division plane candidate creator 43 finds a set of planes (a set of lines in the case of two-dimensional data) perpendicular to each axis, as candidates for a division plane which bisects multi-dimensional data (point set) (step 2).

Figure 7:
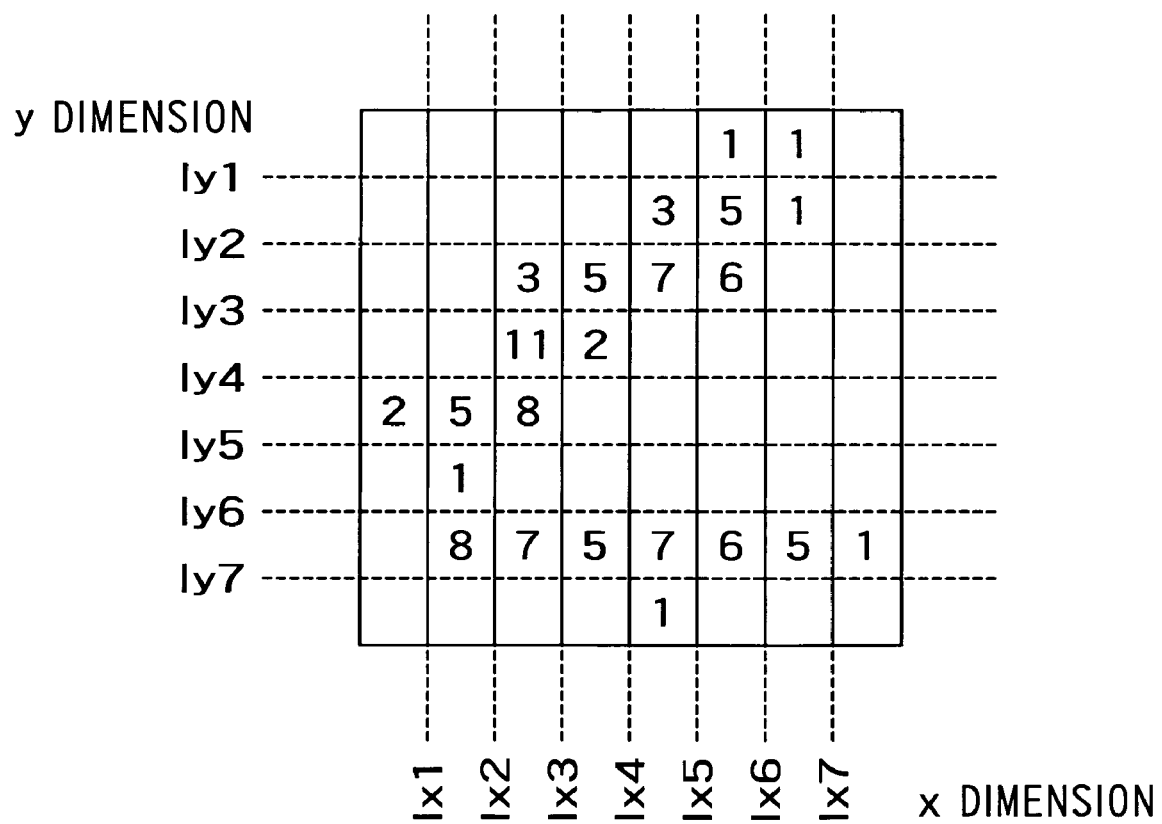
FIG. 7 shows candidates for division line.

Here, a boundary line between two adjacent sections in the matrix generated by the data discretization unit 42 is used as a division plane. Here, intervals between adjacent division planes become constant. However, the intervals need not always be constant. There are m−1 division planes for each dimension. FIG. 7 shows line candidates lx1 to lx7 for a line used to divide the x dimension and candidates ly1 to ly7 for a line used to divide the y dimension.

Figure 8:
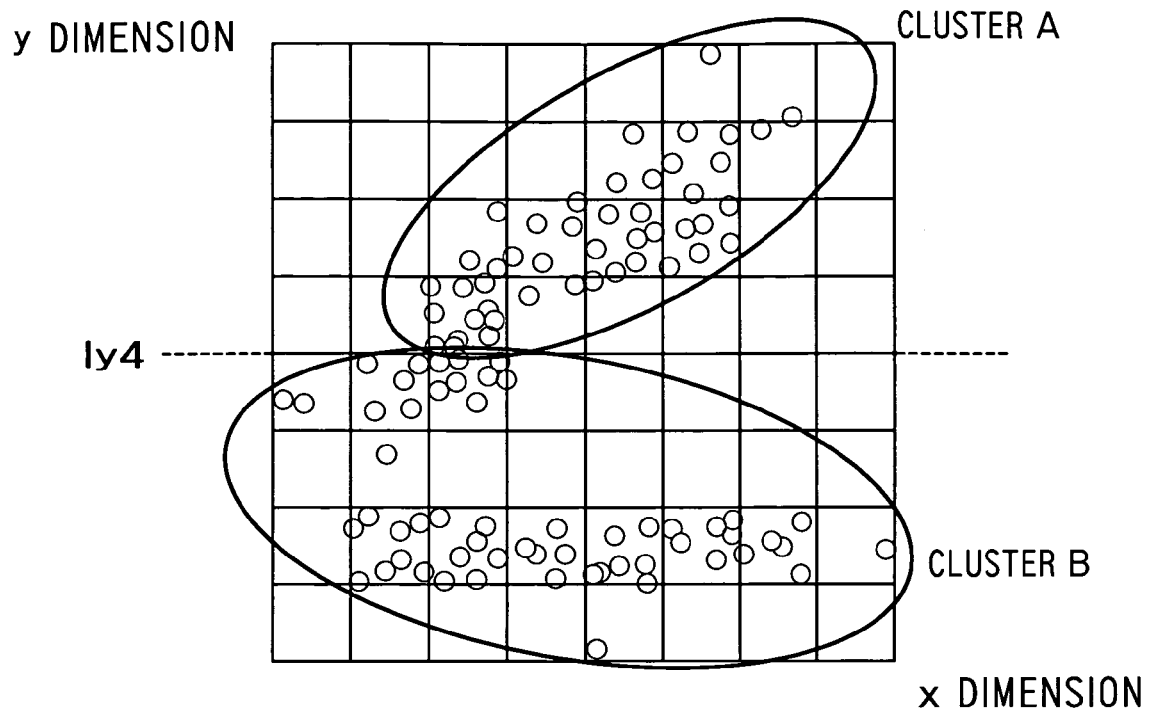
FIG. 8 shows clusters generated by division according to division line.

The data provisional division unit 44 bisects multi-dimensional data by using the division plane obtained by the division plane candidate creator 43 and generates two clusters (step 3). FIG. 8 shows an example in which two clusters A and B have been generated by using a line ly4 perpendicular to the y dimension.

Figure 9:
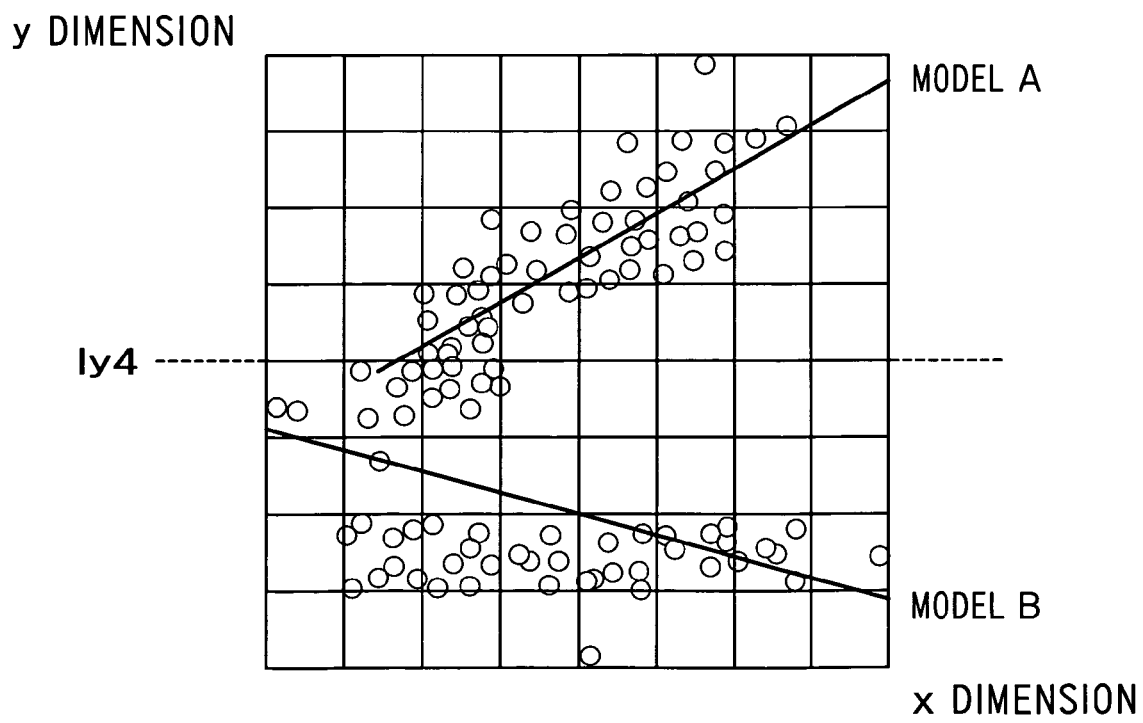
FIG. 9 shows models generated respectively for clusters.

The model generator 45 generates models A and B respectively from the two clusters A and B obtained by the data provisional division unit 44 (step 4). In other words, the model generator 45 generates the model A by using input data belonging to the cluster A, and generates the model B by using input data belonging to the cluster B. The models A and B generated respectively from the clusters A and B are shown in FIG. 9. In generating the models, for example, regression analysis can be used. In other words, the model can be generated by finding a line that conducts regression on y using x. For the model generation, various techniques can be used besides the regression analysis. For example, the principal component analysis may also be used.

The evaluation value calculator 46 calculates an evaluation value for the above-described division on the basis of the models generated by the model generator 45 and the input data (step 5). Details of this calculation will be described hereafter.

An absolute value of a difference between y estimated from x by using the model and actual y is regarded as an error. As to points in the cluster A, errors from the model A are added up to calculate an error of the model A. As to points in the cluster B, errors from the model B are added up to calculate an error of the model B. The error of the model A and the error of the model B are added up. The result obtained by the addition is divided by the number of all points (the number of data) included in the cluster A and B. A resultant value is used as an evaluation value.

The evaluation value may be calculated as hereafter described. In other words, squares of differences each obtained between an estimated value of y and an actual y value for all points are added up. A resultant sum is divided by the number of all points, and a square root of a result of the division is used as an evaluation value.

In the case where the principal component analysis is used in the above-described model generation, if k-dimensional input data is supposed, a plane spanned by the first to the (k−1)th principal components is used as a model, and a distance between the model and a point is regarded as an error. Thereafter, an evaluation value is calculated in the same way as the case where the regression analysis is used.

The steps 3 to 5 heretofore described are conducted on each of the division plane candidates. As a result, an evaluation value is calculated with respect to each of division plane candidates.

The division candidate selector 47 selects a division plane candidate having a highest evaluation value (for example, a minimum evaluation value) from among as many generated evaluation values as the number of the division plane candidates (here, the number is 14) (step 6). If an end condition is satisfied (a continuation condition is not satisfied), however, the division candidate selector 47 outputs an end signal indicating the processing end, without selecting a division plane candidate. The end condition is, for example, that the minimum evaluation value does not become lower than a preset threshold.

The division/decision unit 48 divides input data (point group) by the division plane selected by the division candidate selector 47, and generates two new data sets (step 7). In order to repeat the processing (steps 2 to 7) conducted by the function units 43 to 47 with respect to each of the newly generated data sets, the division/decision unit 48 outputs each data set to the division plane candidate creator 43 (step 8). The division/decision unit 48 determines the end of the repetition processing, for example, as follows.

That is, the division/decision unit 48 sets a flag for each data set when sending data sets to the division plane candidate creator 43. If an end signal is input or division is conducted with respect to a certain data set, the flag for the data set is erased. If all set flags are erased, the processing end is determined. If an end signal is input in a first round of the flow chart shown in FIG. 3, the processing end is determined at that point in time.

As a result of the processing heretofore described, the input data is bisected recursively and clusters are generated.

According to the present embodiment, selecting a division plane that is minimized in error from the model and conducting data division (clustering) by using the selected division plane are repeated recursively as heretofore described. Therefore, multi-dimensional data can be divided into a plurality of clusters while properly reflecting the tendency other than the distance between points, which is immanent in the multi-dimensional data. Thereby, for example, it becomes possible to separate running history data into data differing in running situation, when creating a model for estimating a proper variation range of each sensor in the plant by using values of other sensors.

SECOND EMBODIMENT

In the present embodiment, the evaluation value calculation conducted by the evaluation value calculator 46 will be described in more detail.

As described with reference to the first embodiment, data is divided into DAi and DBi (clusters Ai and Bi are generated) by a certain division plane candidate (denoted by $\phi i$) created by the division plane candidate creator 43, and models Ai and Bi and errors error_Ai and error_Bi are calculated respectively for DAi and DBi. Here, the error_Ai is the sum total of errors of data belonging to DAi, and the error_Bi is the sum total of errors of data belonging to DBi. The number of data belonging to DAi and the number of data belonging to DBi are denoted by num_Ai and num_Bi, respectively.

Model evaluation values error_adjust_Ai and error_adjust_Bi respectively for DAi and DBi are calculated by using the following equations.

$$error\_adjust\_Ai = error\_Ai - \alpha \times num\_Ai + \beta$$

$$error\_adjust\_Bi = error\_Bi - \alpha \times num\_Bi + \beta$$

As for $\alpha$, for example, a value (error before division/the number of data before division) may be used. Here, $\beta$ is a parameter for determining the cease of division.

As for an evaluation value error_adjust_i, a value obtained by providing error_adjust_Ai and error_adjust_Bi with respective weights to yield products and adding up resultant products may be used, or either error_adjust_Ai or error_adjust_Bi having a smaller value may be used. If the error_adjust_i is a threshold (for example, zero) or more, the division plane candidate $\phi i$ is not adopted as a candidate for division.

Figure 10:
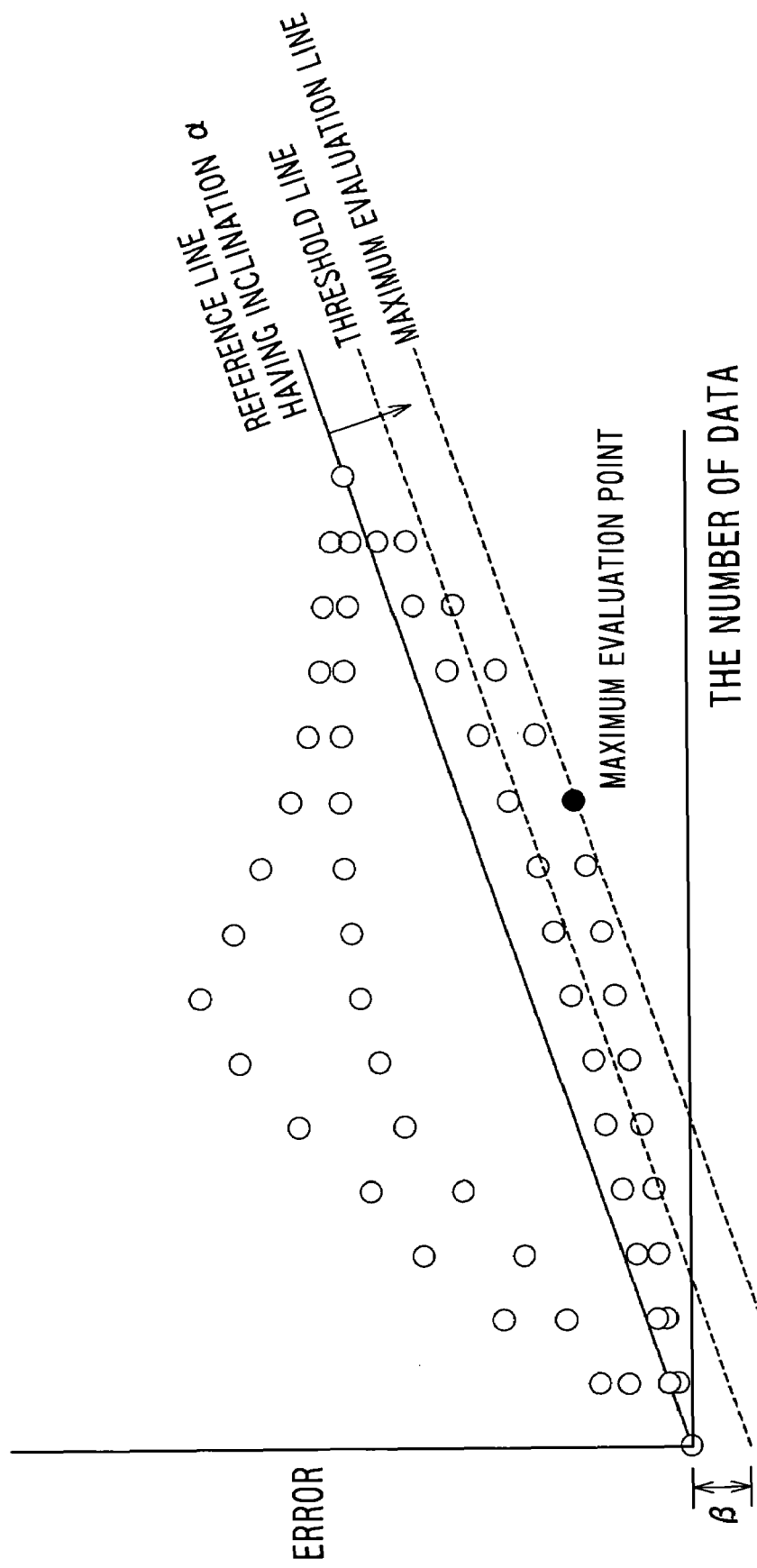
FIG. 10 shows an example of a technique for selecting best data division from among a plurality of data divisions.

FIG. 10 is a diagram showing which candidate among the candidates for the division plane is selected when error_adjust_i=min (error_adjust_Ai, error_adjust_Bi) and $\alpha$=(error before division/the number of data before division).

Points shown in FIG. 10 correspond to the model Ai or Bi respectively associated with the cluster Ai or Bi generated by division using the division plane candidate $\phi i$. In other words, one point corresponds to one model. Therefore, two points are generated per division plane candidate. The ordinate indicates the model error (error_Ai, error_Bi), and the abscissa indicates the number of data (number_Ai, number_Bi).

Here, it is considered to be desirable to have a smaller model error. If the values are approximately the same, it is considered to be desirable to have a larger number of data included in the cluster. According to this criterion, points in the graph are desired to be located at the bottom right-hand corner as far as possible. In order to clarify the reference for selecting a best point, a reference line that passes through the origin and that has an inclination of $\alpha$ as shown in FIG. 10 is determined. This reference line is moved into a bottom right-hand direction perpendicular to the line (i.e., the minus direction of the ordinate), and an evaluation value corresponding to an finally overlapping point (model) is adopted. The line at this time is referred to as maximum evaluation line, and the point having the adopted evaluation value is referred to as maximum evaluation point.

Here, a line obtained by moving the reference line having the inclination $\alpha$ in the minus direction of the ordinate by $\beta$ is referred to as threshold line. If the maximum evaluation line is on or under the threshold line, data division is conducted by using the division plane candidate having the maximum evaluation point. On the other hand, if the maximum evaluation line is above the threshold line, data division is stopped. In other words, the division candidate selector 47 outputs an end signal.

According to the present embodiment, the evaluation value is calculated by using errors before the division and the parameter for determining the cease of the division, as heretofore described. Therefore, a division plane candidate can be properly selected.

THIRD EMBODIMENT

In the present embodiment, processing for merging clusters generated according to the first embodiment is added. Hereafter, the present embodiment will be described in detail.

Figure 21:
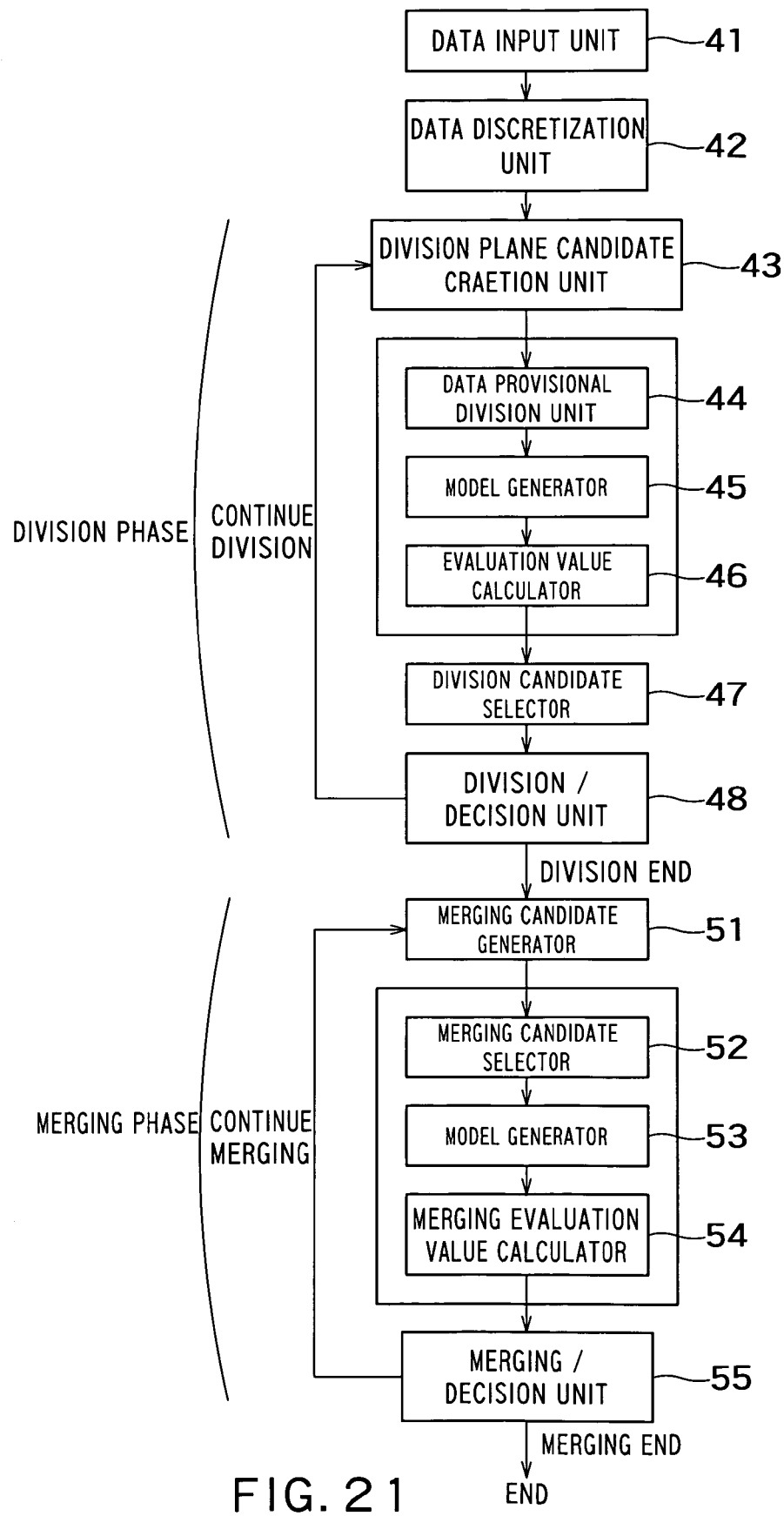
FIG. 21 is a functional block diagram of a data division apparatus according to a third embodiment of the present invention.

FIG. 21 is a functional block diagram schematically showing a configuration of a data division apparatus according to the present embodiment.

Elements 41 to 48 are the same as those shown in FIG. 2. A stage of processing conducted by the elements 43 to 48 is referred to as division phase. In the present embodiment, the data division apparatus further includes a merging candidate generator 51, a merging candidate selector 52, a model generator 53, a merging evaluation value calculator 54, and a merging/decision unit 55. The merging phase is executed by these elements 51 to 55 after the division phase.

Figure 11:
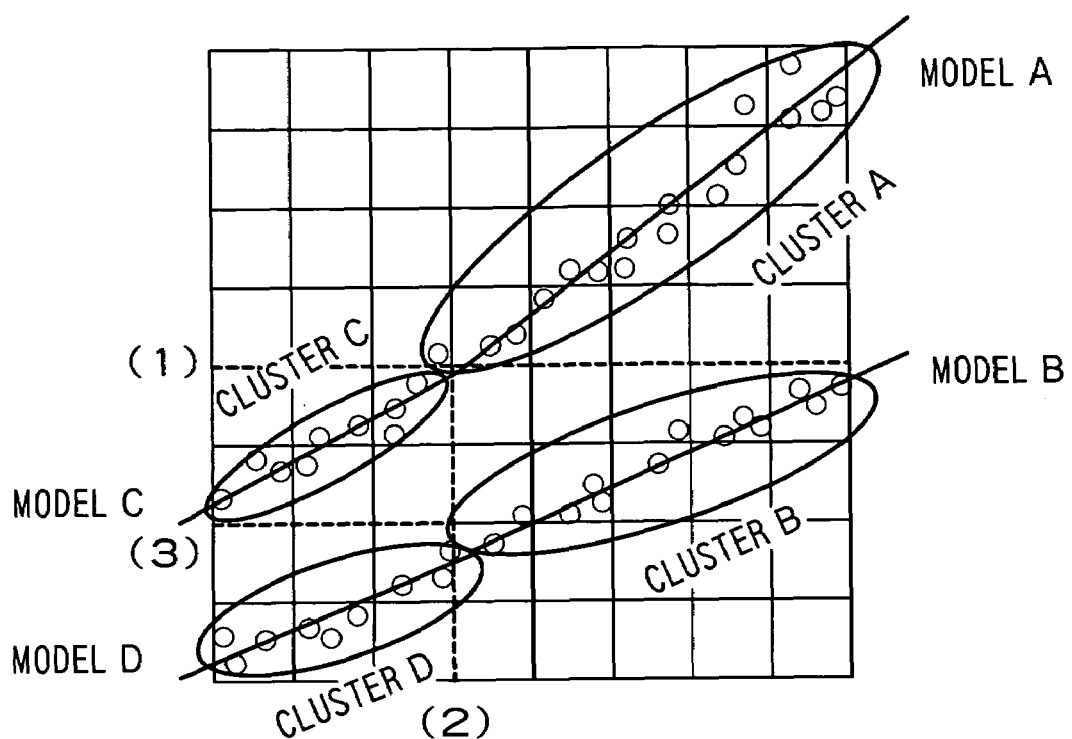
FIG. 11 shows four clusters and models generated respectively from the clusters.

FIG. 11 shows clusters generated by the division phase using the elements 43 to 48 on the basis of certain input data. It is now supposed that division lines are selected in the order of (1), (2) and (3) and clusters A, B, C and D and models A, B, C and D are generated. Thereafter, the merging phase is executed by the elements 51 to 55. Hereafter, the execution of the merging phase will be described.

The merging candidate generator 51 generates cluster pairs by using all combinations from the clusters A, B, C and D. As a result, pairs (A, B), (A, C), (A, D), (B, C), (B, D) and (C, D) (merging candidates) are generated.

The merging candidate selector 52 selects the generated pairs one after another and outputs them to the model generator 53.

The model generator 53 conducts model generation on a set of points in each of input pairs.

The merging evaluation value calculator 54 calculates a merging evaluation value for each of the generated models. The merging evaluation value is calculated according to a function using, for example, model errors, the number of data and the number of models. In the case of the pair (A, B), the calculation is conducted as described below. It is now supposed that the errors of the models A and B are respectively error_A and error_B and the numbers of data are respectively num_A and num_B. Furthermore, it is supposed that an error of a model AB obtained when the clusters A and B are merged is error_AB and the number of data is num_AB. The error_A, error_B and error_AB can be calculated in the same way as the first embodiment. And a difference between (num_A/num_AB)*error_A+(num_B/num_AB)*error_B+1*γ and error_AB+2*γ is obtained as the merging evaluation value. Here, γ is a constant given by a user, and each of "1" and "2" represents the number of models.

If the merging evaluation value satisfies a predetermined reference (a merging reference), for example, if the merging evaluation value is equal to or less than a predetermined value, clusters in the pair are merged by the merging/decision unit 55. If a certain cluster belongs to a plurality of pairs that satisfy the predetermined reference, a pair having a lower merging evaluation value is given priority.

Figure 12:
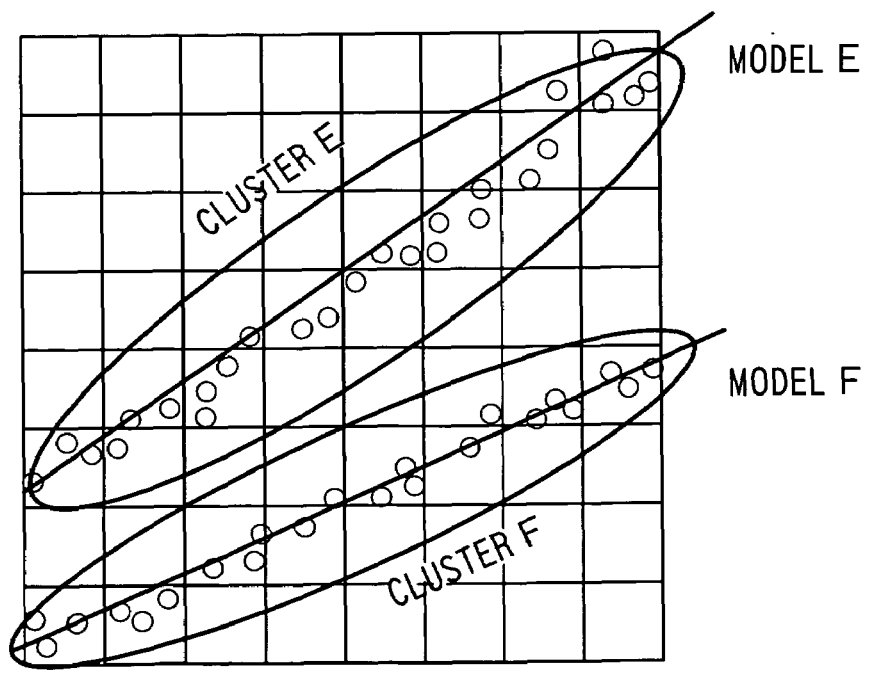
FIG. 12 shows how clusters are joined.

In the present example, there are pairs of six ways (A, B), (A, C), (A, D), (B, C), (B, D) and (C, D) as described above. Merging evaluation values for (A, C) and (B, D) satisfy the above-described predetermined reference. As a result, the merging/decision unit 55 merges the clusters A and C to generate a cluster E, and merges the clusters B and D to generate a cluster F. This state is shown in FIG. 12.

The merging/decision unit 55 outputs the generated clusters (here E and F) and clusters that have not been merged (not present in the present example) to the merging candidate generator 51. The above-described processing is repeated with respect to these clusters. Since a merging evaluation value calculated from the pair (E, F) does not satisfy the predetermined reference, the merging/decision unit 55 terminates processing without merging the clusters E and F. In other words, the clusters E and F finally remain.

By the way, in the merging candidate generator 51, the cluster pairs may include only adjacent clusters. In this case, the number of pairs can be reduced.

According to the present embodiment, clusters are merged as heretofore described. Therefore, it is possible to prevent the number of clusters from increasing unnecessarily.

FOURTH EMBODIMENT

Figure 22:
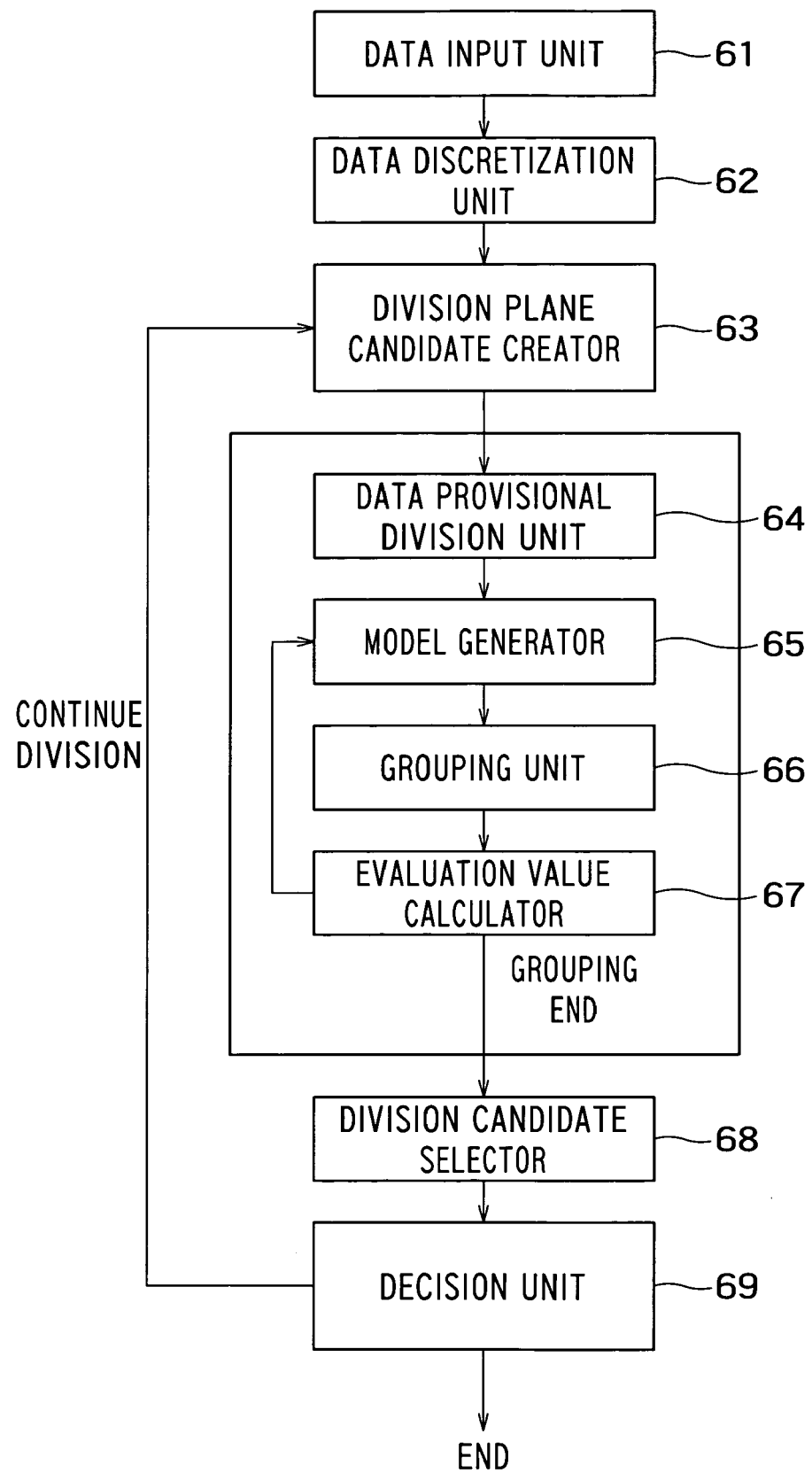
FIG. 22 is a functional block diagram of a data division apparatus according to a fourth embodiment of the present invention.

FIG. 22 is a block diagram schematically showing a configuration of the data division apparatus according to the present embodiment.

First, processing is conducted by a data input unit 61 and a data discretization unit 62 in the same way as the first embodiment. In the subsequent processing, either of data before the discretization and data after the discretization may be used as the multidimensional data. In the former case, the processing becomes fast, but the precision becomes lower. Conversely, in the latter case, the processing time becomes longer, but the precision becomes higher.

Figure 13:
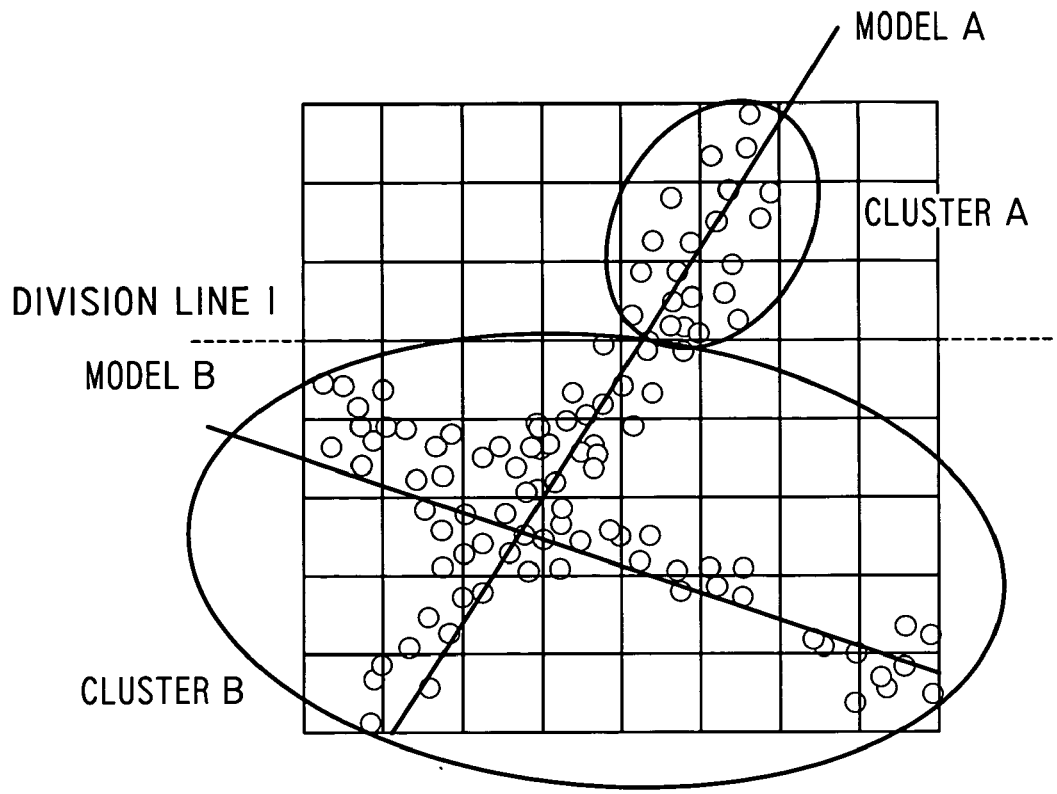
FIG. 13 shows two clusters and models generated respectively from the clusters.

Subsequently, processing is conducted by a division plane candidate creator 63. Then, a data provisional division unit 64 divides input data into two clusters A and B using a certain division line candidate l. Subsequently, a model generator 65 generates models A and B respectively from clusters A and B. This state is shown in FIG. 13.

Figure 14:
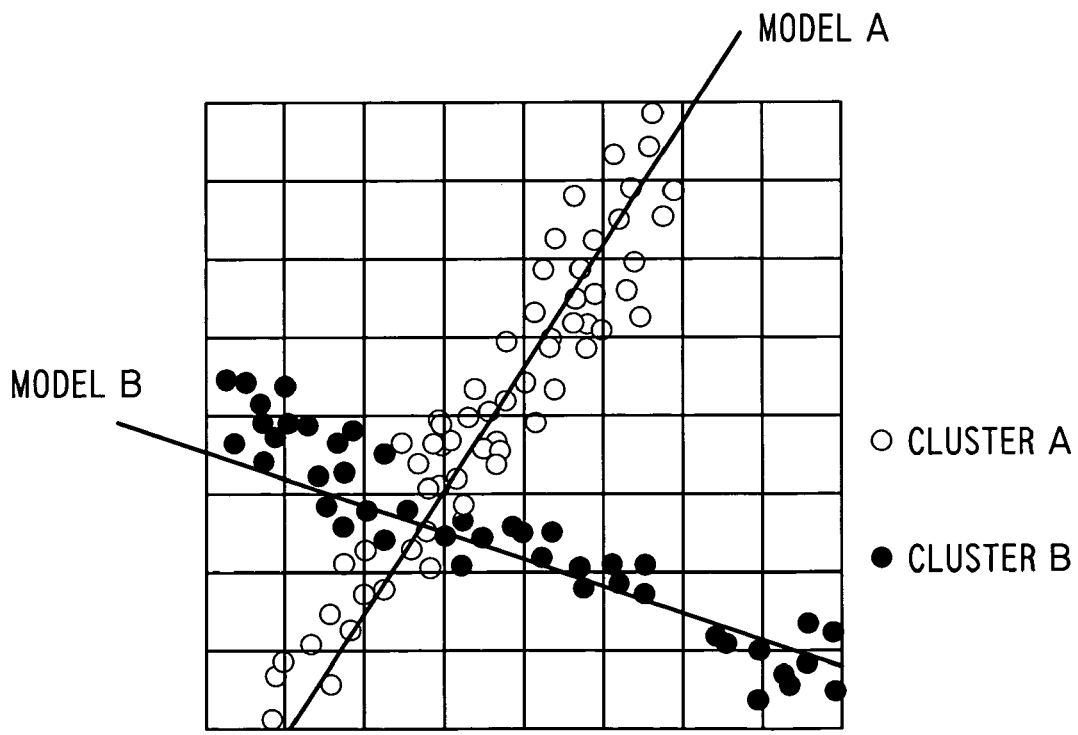
FIG. 14 is a diagram showing regeneration of clusters according to the distance from models.

Here, a grouping unit 66 regroups points (input data) according to the distance from the models. It is supposed that points located near the model A belong to the cluster A and that points located near the model B belong to the cluster B. This state is shown in FIG. 14.

An evaluation value calculator 67 calculates an evaluation value on the basis of the clusters A and B and the models A and B after the re-grouping in the same way as the first or second embodiment, and outputs the calculated evaluation value to a division candidate selector 68.

Upon receiving evaluation values for all division line candidates, the division candidate selector 68 outputs grouping result corresponding to a division line candidate having a best evaluation value among them and the best evaluation value to a decision unit 69. If the best evaluation value satisfies a reference value determined by the user, the decision unit 69 terminates the processing. If the best evaluation value does not satisfy the reference value, the decision unit 69 passes each group to the division plane candidate creator 63. In the foregoing description, the processing conducted by the model generator 65, the grouping unit 66 and the evaluation value calculator 67 may also be repeated. In other words, the model generator 65 and the grouping unit 66 conduct the model generation and the grouping again, and the evaluation value calculator 67 calculates the evaluation value. The processing may be repeated until the evaluation value is not improved, i.e., until the variation in the evaluation becomes a certain value or less, or the processing may be repeated a certain number of times.

FIFTH EMBODIMENT

In a fifth embodiment, the division line (division plane) selected by the division candidate selector 47 shown in FIG. 2 is offset, and a division line having a higher evaluation is searched for. Hereafter, the present embodiment will be described in detail.

Figure 15:
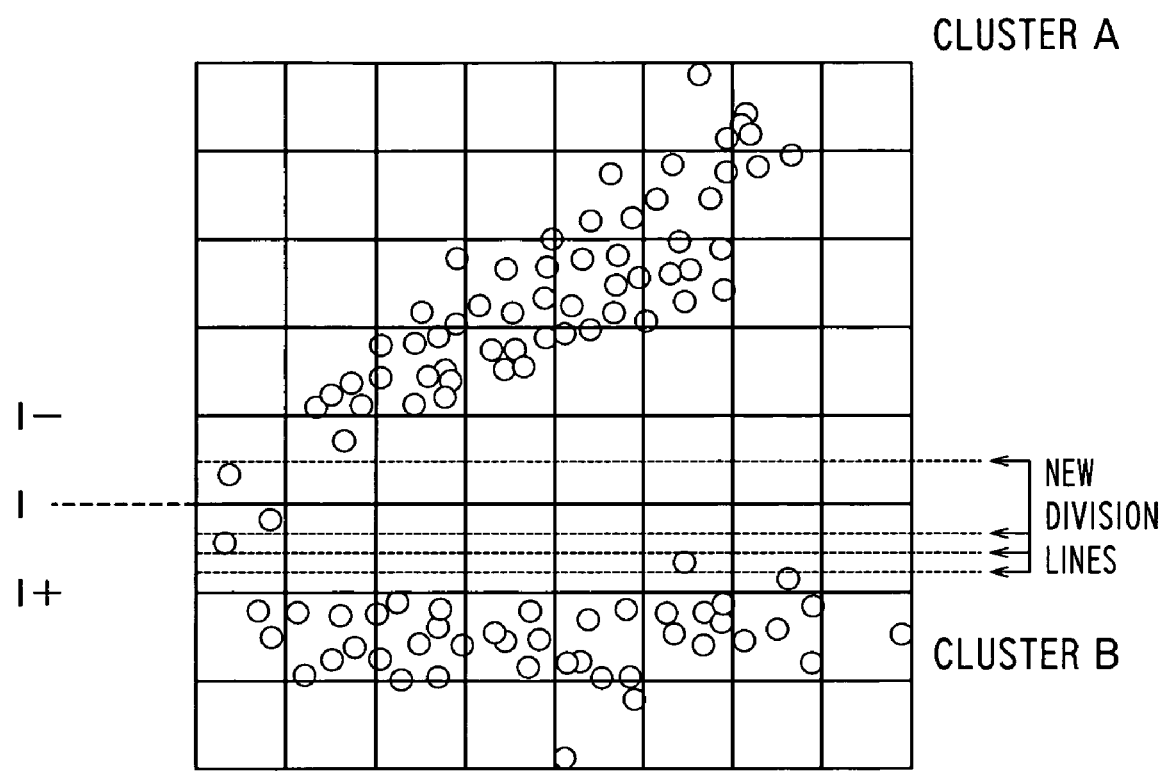
FIG. 15 shows new division line candidates.

It is now supposed that a division line l is selected for certain input data by the division candidate selector 47. It is supposed that division lines l− and l+ are adjacent to the division line l. The division candidate selector 47 creates new division line candidates between the lines l− and l+. As for the way of creating new division line candidates, the interval between l− and l+ may be simply divided into equal parts, or points included between l− and l+ may be separated. An example of drawing lines in a way that separates six points included between l− and l+ is shown in FIG. 15. By the way, if data after the discretization are used in this processing or subsequent processing, it is necessary to discretize data between l− and l+ again. Thereafter, processing using the data provisional division unit 44, the model generator 45 and the evaluation value calculator 46 is conducted again by using these new division lines as division line candidates. In other words, the division candidate selector 47 outputs a new division line candidate to the data provisional division unit 44, and acquires an evaluation value corresponding to a new division line candidate from the evaluation value calculator 46. The division candidate selector 47 selects one having highest evaluation from among candidates for new division lines and division line l, as a division line.

According to the present embodiment, the division line l is offset in the ranges of adjacent division lines as heretofore described. Therefore, it becomes possible to conduct data division independently of intervals of division lines.

SIXTH EMBODIMENT

In the present embodiment, data division (clustering) is conducted while changing the combination of dimensions to be used. Hereafter, the present embodiment will be described in detail.

An example of four-dimensional input data is shown in FIG. 16. Here, one certain dimension is referred to as target dimension and previously given. It is now supposed that the y dimension is the target dimension in FIG. 16. Remaining dimensions are referred to as explanatory dimensions. The number of dimensions to be used is prescribed prior to the processing. It is now supposed that the number of dimensions is three.

First, two dimensions are selected from among the explanatory dimensions, and a three-dimensional series including the two selected dimensions and the target dimension is supposed. In general, when the number of dimensions to be used is k, k−1 dimensions are selected from the explanatory dimensions. If a series formed of the x and z dimensions and the y dimension is selected, a series shown in FIG. 17 is obtained. The processing ranging from the steps 1 to 5 shown in FIG. 3 is applied to the data once in the apparatus shown in FIG. 2. When generating a model at the step 4, a model having the target dimension as a target variable is generated. Similar processing is conducted on combinations of x, y and w dimensions and y, z and w dimensions as well. As a result, the division plane candidate creator 43 generates a plurality of division plane candidates respectively for (x, y, z), (x, y, w) and (y, z, w), and the division candidate selector 47 selects one candidate for each of (x, y, z), (x, y, w) and (y, z, w). Thereafter, the division candidate selector 47 specifies a dimension combination having highest evaluation from among them, and adopts a division plane candidate corresponding to the specified combination. And the division/decision unit 48 conducts data division by using this division plane. The processing is repeated recursively.

By the way, the explanatory dimension may be divided into two dimensions, i.e., a fixed explanatory dimension and an additional explanatory dimension. The fixed explanatory dimension is a dimension that is necessarily used, and the additional explanatory dimension is a dimension selected during the processing. For example, supposing the y dimension to be the target dimension, the x dimension to be the fixed explanatory dimension, and the z and w dimensions to be additional explanatory dimensions, the above-described processing is conducted for the combination of the x, y and z dimensions and the combination of the x, y and w dimensions.

According to the present embodiment, it becomes possible as heretofore described to conduct data division capable of generating high precision model in the case where the number of explanatory dimensions used for the data division is limited to a small number.

SEVENTH EMBODIMENT

Figure 23:
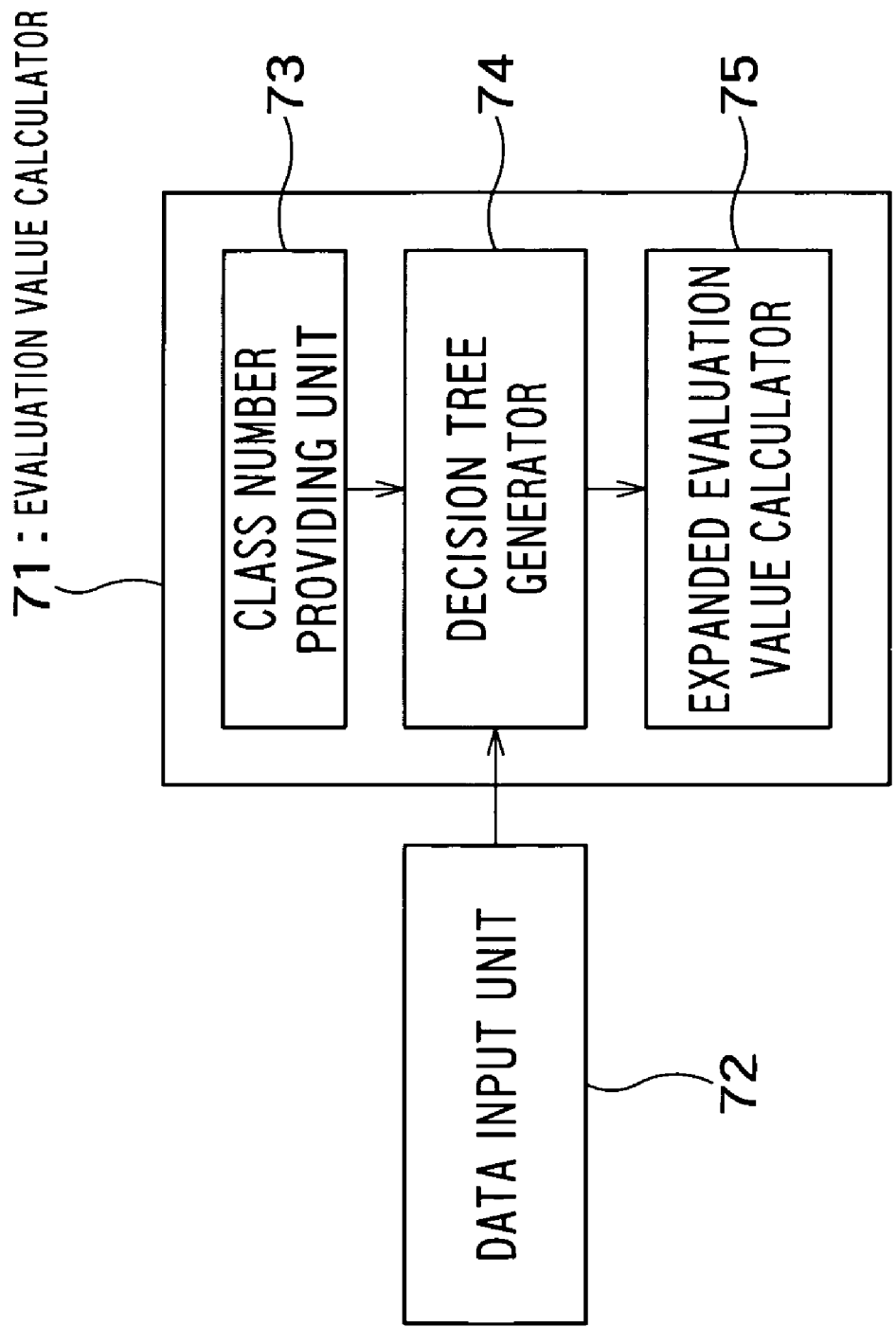
FIG. 23 is a block diagram showing a detailed configuration of an evaluation value calculator in a seventh embodiment of the present invention.

In the present embodiment, evaluation value calculation conducted by the evaluation value calculator 46 is improved on the basis of the first embodiment. A detailed configuration of an evaluation value calculator 71 in the present embodiment is shown in FIG. 23. The evaluation value calculator 71 includes a data input unit 72, a class number providing unit (class number assigning unit) 73, a decision tree generator 74 and an expanded evaluation value calculator 75. The configuration except the evaluation value calculator is similar to that shown in FIG. 2. Hereafter, the present embodiment will be described in detail.

In the present embodiment, dimensions used in the data division and division plane evaluation may be all or a part of the input data dimensions. Furthermore, dimensions used in the data division may be the same as or different from dimensions used in the division plane evaluation.

It is supposed that the input data is four-dimensional, three dimensions x, y and z are used for the data division, and four dimensions x, y, z and w are used for the division plane evaluation. Here, one certain dimension is referred to as target dimension and previously given. It is now supposed that the y dimension is the target dimension. Remaining dimensions are referred to as explanatory dimensions.

First, x, y, and z dimension data are processed in the data discretization unit 42, the division plane candidate creator 43, the data provisional division unit 44 and the model generator 45 according to the first embodiment.

The class number providing unit 73 in the evaluation value calculator 71 assigns a number to each cluster. This is referred to as class number. An example of generated clusters is shown in FIG. 18. Furthermore, the class number providing unit 73 assigns a class number to each of input data 1 to n. Data with assigned class numbers are shown in FIG. 19. A 0 or 1 added to the rightmost of each data is the class number. The processing heretofore described is conducted for each division plane candidate.

The decision tree generator (classification rule generator) 74 in the evaluation value calculator 71 generates a decision tree (classification rule) having dimensions other than the target dimension y among the input data dimensions (i.e., the explanatory dimensions) as its attribute and having a class number as its class. An example of a decision tree generated from the data shown in FIG. 19 is shown in FIG. 20. In generating the decision tree, data other than those used for data division may be used. In this case, pertinent data is supplied from the data input unit 72 to the decision tree generator 74. The decision tree generator 74 generates a decision tree corresponding to each of the division plane candidates.

The expanded evaluation value calculator 75 in the evaluation value calculator 71 calculates an evaluation value e for each of division plane candidates in the same way as the first embodiment, and calculates values, such as a precision p of a decision tree corresponding to each of the division plane candidates and a depth d (having a depth 1 in the case of FIG. 20) of the decision tree. And the expanded evaluation value calculator 75 modifies the evaluation value e by using the values p and d, and calculates an expanded evaluation value. For example, the expanded evaluation value calculator 75 calculates the expanded evaluation value by using an expression, e+r×p+s×d. Here, r and s are weighting coefficients.

The division candidate selector 47 (see FIG. 2) subsequent to the evaluation value calculator 71 selects a division plane candidate by using this expanded evaluation value. For example, the division candidate selector 47 selects a division plane candidate having a smallest evaluation value.

According to the present embodiment, the evaluation value is calculated taking elements such as the precision of the classification rule and the depth into consideration as heretofore described. Therefore, a division plane candidate can be selected properly.

EIGHTH EMBODIMENT

In the present embodiment, processing in any of the above-described embodiments is conducted on a plurality of ways of combination of dimensions, and models are generated respectively from combinations of dimensions. Models corresponding to combinations of dimensions are evaluated, and data division corresponding to a model having highest evaluation is adopted. Hereafter, the present embodiment will be described in detail.

Figure 24:
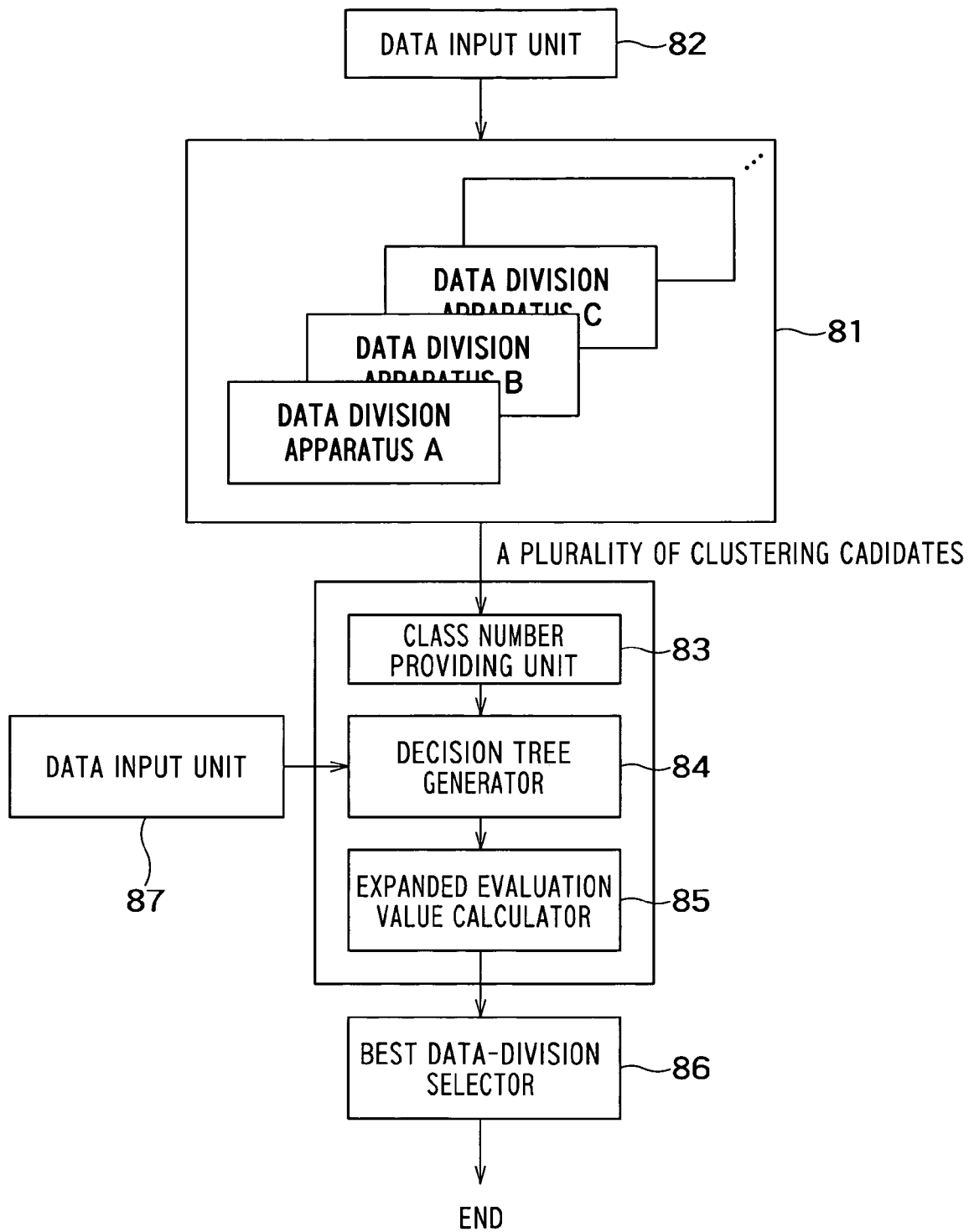
FIG. 24 is a functional block diagram of a data division apparatus according to an eighth embodiment of the present invention.

FIG. 24 is a block diagram schematically showing a configuration of a data division apparatus according to the present embodiment.

An element 81 denotes a plurality of data division apparatuses A, B, C . . . . The data division apparatuses A, B, C . . . are data division apparatuses according to any of the first to seventh embodiments. For example, the data division apparatuses A, B, C . . . are data division apparatuses according to the first embodiment, or the data division apparatuses A, B, C . . . are data division apparatuses according to the second embodiment. However, each of the data division apparatuses A, B, C . . . does not include a data input unit. In the present embodiment, a data input unit 82 common to the data division apparatuses A, B, C . . . is disposed.

It is supposed that input data supplied from the data input unit 82 to the data division apparatuses A, B, C . . . is the same, and that the target dimension is the same in the data division apparatuses A, B, C . . . However, the dimension used in the data division may differ for each of the data division apparatuses. For example, supposing the target dimension to be y, the data division apparatuses A, B, C . . . respectively utilize (x, y, z), (x, y, w), (z, y, w) for the data division. In addition, the number of dimensions may differ. In this case, (x,y), (y,z), (y,w) are utilized. As a result of processing, the data division apparatuses A, B, C . . . output models A, B, C . . . and data division candidates A, B, C . . . , respectively. The data division candidate A includes a plurality of clusters obtained as a result of data division, and the model A is a set of models corresponding to respective clusters. In the same way, the data division candidate B includes a plurality of clusters obtained as a result of data division, and the model B is a set of models corresponding to respective clusters. The data division candidate C includes a plurality of clusters obtained as a result of data division, and the model C is a set of models corresponding to respective clusters.

A class number providing unit (class number assigning unit) 83 provides each of clusters included in the data division candidates A, B, C . . . with a class number. The class number providing unit 83 provides each of data included in the input data with a class number.

A decision tree generator 84 generates a decision tree A, B, C . . . having dimensions other than the target dimension (i.e., the explanatory dimensions) as its attribute and having a class number as its class, for each of the data division candidates A, B, C . . . . Data used to generate the decision tree may be the same as the data used for the data division, or may be different from the data used for the data division. In the latter case, data is supplied from a data input unit 87 to the decision tree generator 84.

An expanded evaluation value calculator 85 calculates an expanded evaluation value based on the values e, p and d indicated in the seventh embodiment by using the decision tree A, B, C . . . for each of the models A, B, C . . . .

A best data-division selector 86 selects a data division candidate having highest evaluation among expanded evaluation values.

According to the present embodiment, a data division candidate capable of generating a high precision model can be determined.

What is claimed is:

1. A data division apparatus which divides multi-dimensional data including a plurality of data pieces, comprising:
    a data input unit which inputs the multi-dimensional data;
    a division plane candidate creator which creates a plurality of division plane candidates for dividing the multi-dimensional data;
    a data provisional division unit which provisionally divides the multi-dimensional data by using the division plane candidates to generate clusters from each of the division plane candidates, the clusters each including one or more data piece;
    a model generator which generates models representing the clusters, per each of the division plane candidates;
    an evaluation value calculator which calculates evaluation values for evaluating the division plane candidates, on the basis of the models generated associated with the division plane candidates and the multi-dimensional data;
    a division candidate selector which compares evaluation values respectively corresponding to the division plane candidates and selects a division plane candidate having a highest evaluation value; and
    a data division unit which divides the multi-dimensional data by using the selected division plane candidate,
    wherein the evaluation value calculator
    calculates errors of the generated models on the basis of the generated models and clusters respectively corresponding to the generated models,
    divides an error of a model corresponding to the multi-dimensional data by the number of data pieces contained in the multi-dimensional data,
    calculates model evaluation values respectively of the models on the basis of the calculated errors of the models, a result value of the dividing, and numbers of data pieces respectively contained in the clusters,
    calculates the evaluation value based on the model evaluation values of the models,
    wherein the evaluation value calculator calculates the model evaluation value of each of the models by subtracting a product of the dividing result value and the number of data pieces contained in each of the clusters and a parameter value from the calculated error of each of the models.

2. A data division apparatus which divides multi-dimensional data including a plurality of data pieces, comprising:
    a data input unit which inputs the multi-dimensional data;
    a division plane candidate creator which creates a plurality of division plane candidates for dividing the multi-dimensional data;

a data provisional division unit which provisionally divides the multi-dimensional data by using the division plane candidates to generate clusters from each of the division plane candidates, the clusters each including one or more data piece;

a model generator which generates models representing the clusters, per each of the division plane candidates;

an evaluation value calculator which calculates evaluation values for evaluating the division plane candidates, on the basis of the models generated associated with the division plane candidates and the multi-dimensional data;

a division candidate selector which compares evaluation values respectively corresponding to the division plane candidates and selects a division plane candidate having a highest evaluation value;

a data division unit which divides the multi-dimensional data by using the selected division plane candidate;

a merging candidate generator which generates a plurality of cluster combinations as merging candidates, from clusters finally generated as a result of division conducted by the data division unit;

a merging candidate selector which selects a merging candidate from the merging candidates;

a further model generator which generates a model from the merging candidate;

a merging evaluation value calculator which calculates an error of the model generated by the further model generator, and calculates a merging evaluation value based on errors of models corresponding to clusters contained in the merging candidate and the error of the model generated by the further model generator; and a merging unit which merges clusters included in the merging candidate and generates a new cluster if the merging evaluation value satisfies a merging reference.

3. A data division apparatus which divides multi-dimensional data including a plurality of data pieces, comprising:

a data input unit which inputs the multi-dimensional data;

a division plane candidate creator which creates a plurality of division plane candidates for dividing the multi-dimensional data;

a data provisional division unit which provisionally divides the multi-dimensional data by using the division plane candidates to generate clusters from each of the division plane candidates, the clusters each including one or more data piece;

a model generator which generates models representing the clusters, per each of the division plane candidates;

an evaluation value calculator which calculates evaluation values for evaluating the division plane candidates, on the basis of the models generated associated with the division plane candidates and the multi-dimensional data;

a division candidate selector which compares evaluation values respectively corresponding to the division plane candidates and selects a division plane candidate having a highest evaluation value; and a data division unit which divides the multi-dimensional data by using the selected division plane candidate;

wherein the evaluation value calculator comprises:

a class number assigning unit which assigns class numbers to clusters after provisional division and assigns the class numbers to the data pieces in the multi-dimensional data;

a classification rule generator which generates a decision tree to predict a class number from data piece, based on the multi-dimensional data assigned the class numbers; and an expanded evaluation value calculator which calculates an expanded evaluation value based on at least either of precision and size of the decision tree and the evaluation value, wherein the division candidate selector uses the expanded evaluation value instead of the evaluation value.

4. The data division apparatus according to claim 3, wherein the expanded evaluation value calculator calculates the expanded evaluation value by adding a value obtained by multiplying the precision of the decision tree by a first weighting coefficient and a value obtained by multiplying the size of the decision tree by a second weighting coefficient to the evaluation value.

5. A data division apparatus which divides multi-dimensional data including a plurality of data pieces, comprising:

a data input unit which inputs the multi-dimensional data;

a division plane candidate creator which creates a plurality of division plane candidates for dividing the multi-dimensional data;

a data provisional division unit which provisionally divides the multi-dimensional data by using the division plane candidates to generate clusters from each of the division plane candidates, the clusters each including one or more data piece;

a model generator which generates models representing the clusters, per each of the division plane candidates;

an evaluation value calculator which calculates evaluation values for evaluating the division plane candidates, on the basis of the models generated associated with the division plane candidates and the multi-dimensional data;

a division candidate selector which compares evaluation values respectively corresponding to the division plane candidates and selects a division plane candidate having a highest evaluation value; and a data division unit which divides the multi-dimensional data by using the selected division plane candidate, wherein the data pieces in the multi-dimensional data are made up of a plurality of dimensions, respectively, the division plane candidate creator creates a plurality of division plane candidates for each of a plurality of dimension combinations obtained by using a part of the plurality of dimensions, and the data division unit outputs finally a plurality of data division results by the data division unit correspondingly to the plurality of dimension combinations, and the data division apparatus further comprises:

a class number assigning unit which assigns a class number to clusters included in the data division result for each of the plurality of data division results;

a classification rule generator which generates a classification rule to predict a class number from values of the corresponding dimension combination based on the multi-dimension data for each of the plurality of data division results;

an expanded evaluation value calculator which calculates an expanded evaluation value based on models corresponding to the clusters in the data division result, the multi-dimensional data, and at least either of the precision and size of the classification rule for each of the plurality of data division results; and a data division selector which selects a data division result having a highest expanded evaluation value among the plurality of data division results.

6. A data division apparatus which divides multi-dimensional data including a plurality of data pieces, comprising:
   a data input unit which inputs the multi-dimensional data;
   a division plane candidate creator which creates a plurality of division plane candidates for dividing the multi-dimensional data;
   a data provisional division unit which provisionally divides the multi-dimensional data by using the division plane candidates to generate clusters from each of the division plane candidates, the clusters each including one or more data piece;
   a model generator which generates models representing the clusters, per each of the division plane candidates;
   a grouping unit which generates new clusters by grouping data pieces in the multi-dimensional data, based on to which of the generated models each data piece is most close, per each of the division plane candidates;
   an evaluation value calculator which calculates evaluation values for evaluating the groupings associated with the division plane candidates, based on the models generated associated with the division plane candidates and the new clusters generated associated with the division plane candidates; and
   a division candidate selector which compares evaluation values respectively corresponding to the division plane candidates and selects grouping result corresponding a division plane candidate having a highest evaluation value among the division plane candidates.

7. The data division apparatus according to claim 6, wherein the evaluation value calculator outputs the generated new clusters to the model generator, and passes a late calculated evaluation value to the division candidate selector.

* * * * *